(12) United States Patent
Li (10) Patent No.: US 6,385,371 B1
(45) Date of Patent: May 7, 2002

(54) OPTICAL SYSTEM INCLUDING COUPLING FOR TRANSMITTING LIGHT BETWEEN A SINGLE FIBER LIGHT GUIDE AND MULTIPLE SINGLE FIBER LIGHT GUIDES

(75) Inventor: Kenneth K. Li, Arcadia, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 0 days.

(21) Appl. No.: 09/541,516

(22) Filed: Apr. 3, 2000

(51) Int. Cl.$^7$ .................................................. G02B 6/04

(52) U.S. Cl. ........................... 385/43; 385/121; 385/47

(58) Field of Search .............................. 385/43, 121, 47

(56) References Cited

U.S. PATENT DOCUMENTS

| | | | |
|---|---|---|---|
| 5,341,445 A | 8/1994 | Davenport et al. | 385/39 |
| 5,857,041 A | 1/1999 | Riser et al. | 385/31 |

Primary Examiner—Hung N. Ngo
(74) Attorney, Agent, or Firm—Rothwell, Figg, Ernst & Manbeck (57) ABSTRACT

An optical system includes a coupling for transmitting light between one single fiber light guide and multiple single fiber light guides. The interface surfaces coupling the single fiber light guide to the multiple light guides have polygonal cross-sectional shapes, and the interface surface of the single fiber light guide is substantially covered by the interface surfaces of the multiple single fiber light guides. The single fiber light guide on one side of the coupling and the multiple single fiber light guides on the opposite side of the coupling each have a smoothly tapered contracting section extending away from the respective interface surfaces.

37 Claims, 10 Drawing Sheets

OPTICAL SYSTEM INCLUDING COUPLING FOR TRANSMITTING LIGHT BETWEEN A SINGLE FIBER LIGHT GUIDE AND MULTIPLE SINGLE FIBER LIGHT GUIDES

FIELD OF THE INVENTION

The present invention is directed to an optical system that includes a coupling for efficiently transmitting, with minimum loss, light between a single fiber light guide and multiple single fiber light guides.

BACKGROUND OF THE INVENTION

Large core optical fibers have been used recently in many applications, including architectural lighting, remote illuminations, and decorative lighting. Such fibers generally have a round cross-sectional shape and consist of a single highly transparent core material that is covered with a cladding formed of a material having a lower refractive index than that of the core, such that light can be guided along the length of the fiber. One problem in implementing many of the practical applications for such large core fibers is the inability to efficiently provide multiple fiber outputs from a single fiber input, or light source, or vice versa. Various light coupling schemes have been developed and implemented, and most suffer from either nonuniform splitting of the light energy amongst the output fibers, excessive losses, or both.

Figure 1:
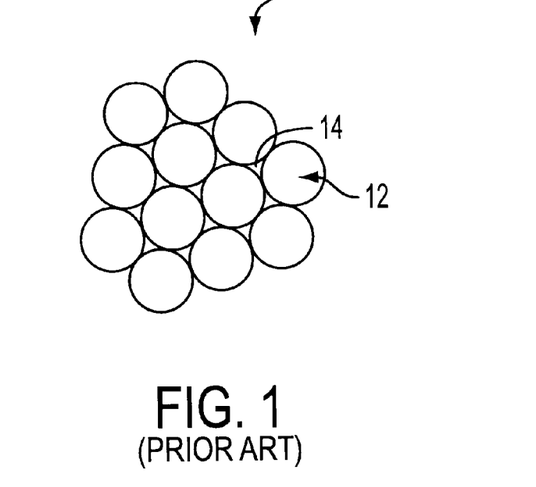
FIG. 1 is an end view of a prior art optical fiber bundle for dividing the light output of a single fiber input into multiple individual fibers.
Figure 2:
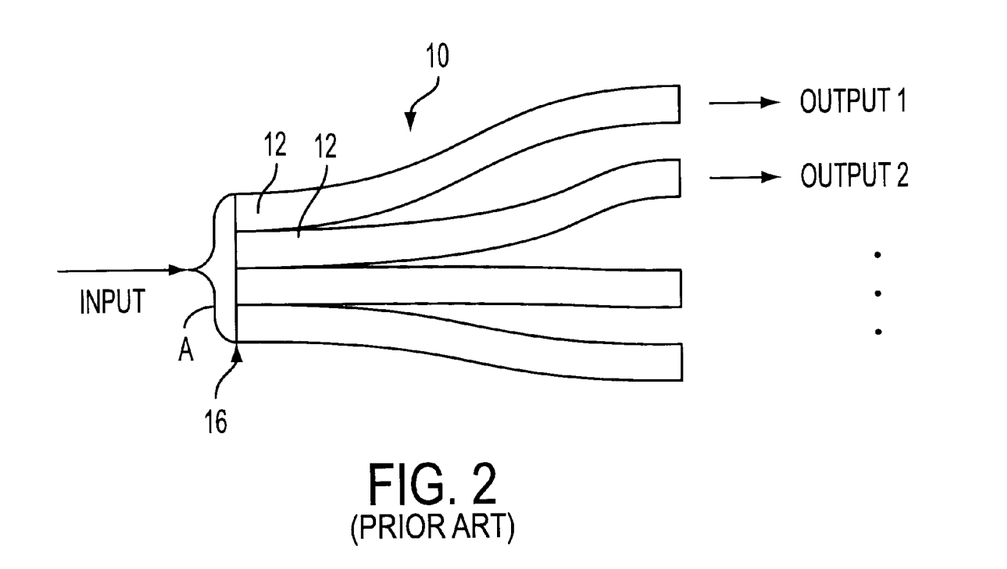
FIG. 2 is a side view of the prior art bundle of FIG. 1.

For example, a common method for splitting the light energy from a single input fiber into multiple output fibers is shown in FIGS. 1 and 2. A bundle 10 of individual output fibers 12 is constructed, and the beam of an input fiber or illuminator is input to the leading ends 16 of the bundled fibers 12. As shown in FIG. 1, due to the round cross-sectional shape of the individual fibers 12, interfiber gaps 14 are formed between adjacent fibers in the bundle 10. Due to the circular cross-sectional shape of the fibers, such interfiber gaps 14 are unavoidable and are usually filled with epoxy to hold the individual fibers 12 together in the bundle 10. Thus, the gaps 14 do not contribute to light transmission and therefore constitute a light energy loss.

In addition, as shown in FIG. 2, the input beam available at the output of an illuminator or at the end of an input fiber is normally not uniform in its intensity profile, as represented by the profile curve designated "A." Accordingly, it can be appreciated that the amount of light coupled into the various output fibers 12 will vary from fiber to fiber. The amount of light in output 1 can be substantially different from that of output 2, depending on the intensity profile A of the input beam and the relative locations of outputs 1 and 2.

Another method for coupling light between one single fiber light guide and multiple single fiber light guides is described in U.S. Pat. No. 5,857,041. The apparatus described in the '041 patent uses multiple lenses in a lens array that is constructed such that the full cross-section of the input beam is covered with lenses. Each individual lens corresponds to one output fiber. In the device shown in the '041 patent, while the mismatch between the output area of the input fiber and the input area of the combined output fibers can be small, the addition of the lenses introduces extra Fresnel reflection losses and aberrations, thus decreasing the brightness of the transmitted light. Furthermore, the output of each fiber can also be different depending on the input intensity distribution of the light.

U.S. Pat. No. 5,341,445 describes an arrangement for coupling light from a light source to a plurality of output fibers using a polygonal-shaped coupler such that the output intensity profile of the input fiber is uniform. Accordingly, the output power from fiber to fiber is uniform. Although the output power is uniform from fiber to fiber, the efficiency is low due to the spaces between the output fibers as described above.

Accordingly, a need exists for an optical system having a coupling for transmitting light between one single fiber light guide and multiple single fiber light guides that avoids losses due to interfiber gaps and also avoids fiber to fiber output power variations due to the non-uniformity of the input light intensity profile.

SUMMARY OF THE INVENTION

An optical system includes a first coupler having a first transmitting section comprising a single fiber light guide, a first interface surface that has a polygonal cross-sectional shape, and a first transition section connecting the first transmitting section and the first interface surface and having a cross-sectional shape that varies smoothly from the cross-sectional shape of the first transmitting section to the cross-sectional shape of the first interface surface. The system also includes a second coupler having two or more single fiber light guides, each of the single fiber light guides including a second transmitting section, a second interface surface that has a polygonal cross-sectional shape, and a second transition section connecting the second transmitting section and the second interface surface and having a cross-sectional shape that varies smoothly from the cross-sectional shape of the second transmitting section to the cross-sectional shape of the second interface surface. The first coupler is in optical communication with the second coupler. The two or more single fiber light guides of the second coupler are arranged in mutual, lateral juxtaposition with the second interface surfaces thereof operatively positioned to transmit light to or from the first interface surface of the first coupler and with minimal gaps between adjacent ones of the second interface surfaces of the two or more single fiber light guides. The second interface surfaces of the two or more single fiber light guides of the second coupler have a combined cross-sectional area is substantially equal to a cross-sectional area of the first interface surface of the first coupler, so that the first interface surface is substantially covered by the second interface surfaces of the two or more single fiber light guides of the second coupler.

Light from a single input fiber optically coupled to the first transmitting section of the first coupler can be transmitted into the second coupler and divided into multiple output fibers optically coupled to the second transmitting sections of the second coupler. Alternatively, light from multiple input fibers optically coupled to the second transmitting sections of the second coupler can be coalesced into a single output fiber coupled to the first transmitting section of the first coupler.

The polygonal cross-sectional shape of the fist interface surface of the first coupler creates a more uniform intensity distribution, thus transmitting more uniform amounts of light to each single fiber of the second coupler. The polygonal cross-sectional shape of the second interface surfaces of the second coupler permits the two or more single fiber light guides of the second coupler to be arranged with little or no interfiber gap between adjacent light guides. Moreover, because the second interface surfaces substantially cover the first interface surface, transmission between the first and second interface surfaces can occur with little or no loss.

Other objects, features, and characteristics of the present invention will become apparent upon consideration of the following description and the appended claims with reference to the accompanying drawings, all of which form a part of the specification, and wherein like reference numerals designate corresponding parts in the various figures.

DESCRIPTION OF THE DRAWINGS

Embodiments of the present invention will be described with reference to the attached drawings in which like components or features in the various figures are represented by like reference numbers.

DETAILED DESCRIPTION OF THE INVENTION

With reference to the figures, exemplary embodiments of the invention will now be described. These embodiments illustrate principles of the invention and should not be construed as limiting the scope of the invention.

Figure 3:
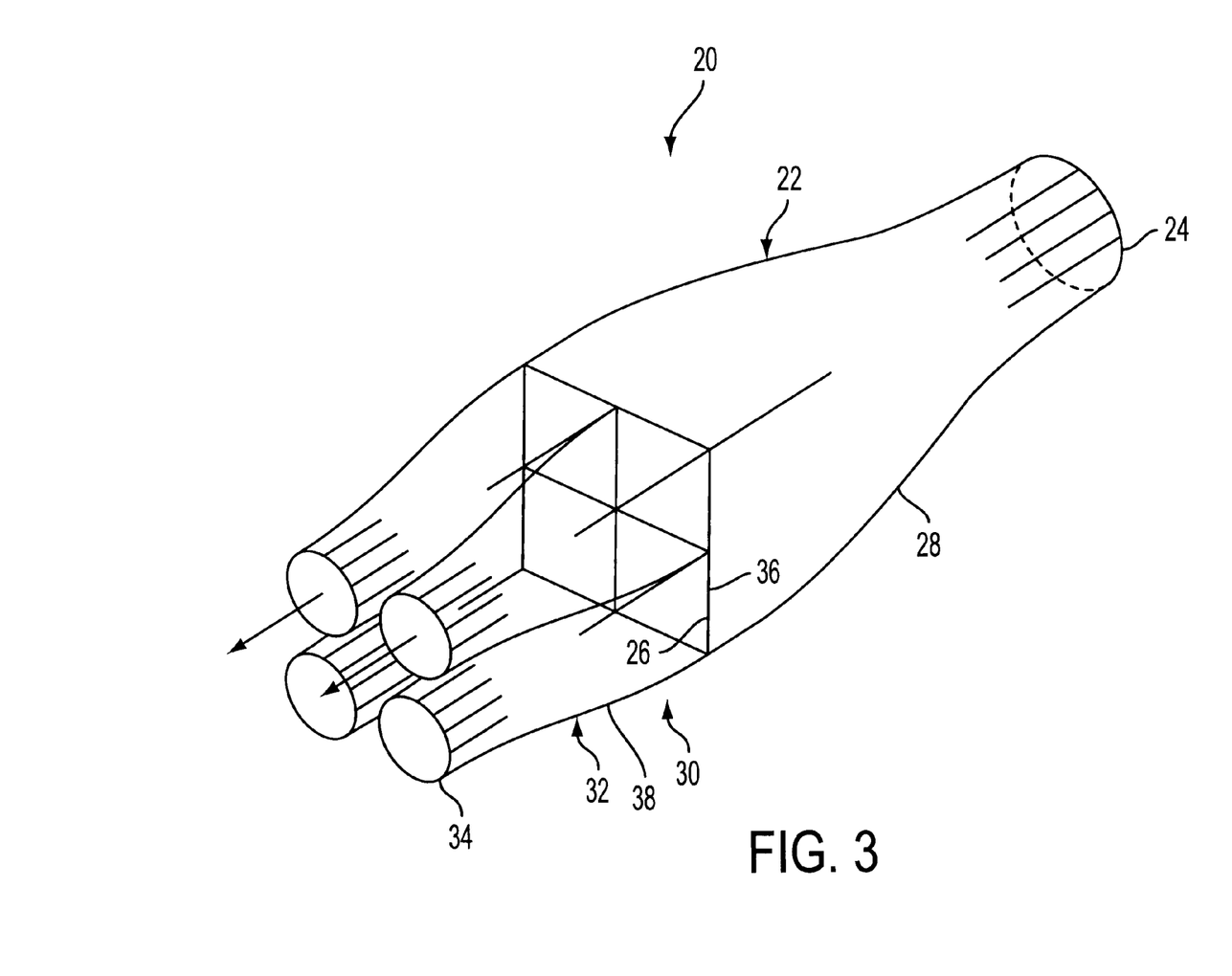
FIG. 3 is a perspective view of a coupler of the present invention.
Figure 3A:
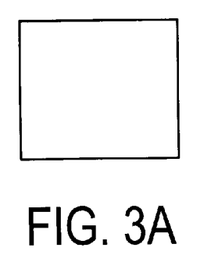
FIGS. 3a–3g show alternative cross-sectional shapes of light transmitting planes of the coupler.
Figure 3B:
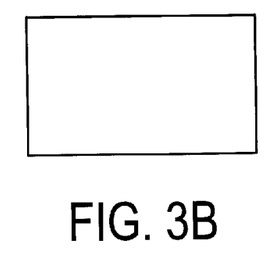
Figure 3C:
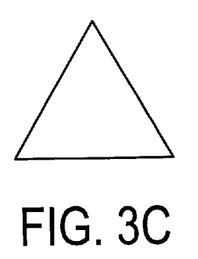
Figure 3D:
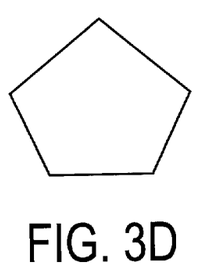
Figure 3E:
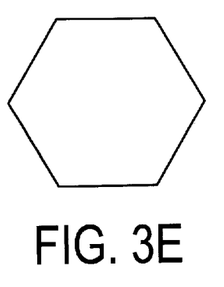
Figure 3F:
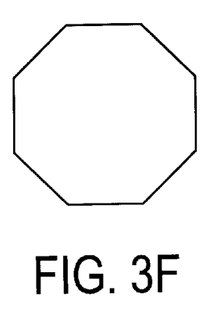

An optic coupling for transmitting light between one single fiber light guide and multiple single fiber light guides is designated generally by reference number 20 in FIG. 3. The optic coupling 20 comprises an elongated light transmissive body comprising a first coupler 22 and a second coupler 30. The first coupler 22 includes a first transmitting section 24 that comprises a section of a single fiber light guide that receives light from a single light source or from a single fiber input. Alternatively, the transmitting section 24 transmits light in an opposite direction toward to a single fiber output or other illumination device.

Figure 3G:
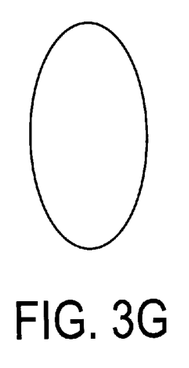

Although the first transmitting section 24 is generally depicted as a leading end of an optic guide having a generally constant cross-sectional area and generally circular cross-sectional shape for a short axial extent, the first transmitting section 24 may comprise a light guide of substantially longer axial extent, or it may comprise simply an optically transmissive plane having no axial extent. The cross-sectional shape of the transmitting section 24 may be circular, as shown in FIG. 3, or it may be elliptical (FIG. 3g). Alternatively, the cross-sectional shape of the transmitting section 24 may be a polygon, for example, a square, a rectangle, a triangle, a pentagon, a hexagon, an octagon (FIGS. 3a–3f), etc.

The first coupler 22 has a first interface surface 26 that has a polygonal cross-sectional shape. In the illustrated embodiment, the cross-sectional area of the first interface surface 26 is larger than the cross-sectional area of the first transmitting section 24. Alternatively, the cross-sectional area of the first interface surface 26 may be less than or equal to the cross-sectional area of the first transmitting section 24, depending on output requirements. In the preferred embodiment, as shown in FIG. 3, the cross-sectional shape of the first interface surface 26 is square, but other polygonal shapes such as rectangle, triangle, pentagon, hexagon, octagon (see FIGS. 3b–3f), or the like may be employed as well.

A first transition section 28 connects the first transmitting section 24 to the first interface surface 26 and has a cross-sectional shape and area that vary smoothly from the cross-sectional shape and area of the first transmitting section 24 to the cross-sectional shape and area of the first interface surface 26 such that there is minimum loss of transmitted power.

The second coupler 30 comprises two or more individual single fiber light guides 32 arranged in mutual juxtaposition to one another. Each of the individual fiber light guides 32 includes a second transmitting section 34, a second interface surface 36 that has a polygonal cross-sectional shape and a cross-sectional area that is larger than (or, alternatively, less than or equal to) the cross-sectional area of the second transmitting section 34, and a second transition section 38 connecting the second transmitting section 34 and the second interface surface 36 and having a cross-sectional shape and area that vary smoothly from the cross-sectional shape and area of the second transmitting section 34 to the cross-sectional shape and area of the second interface surface 36 such that there is a minimum loss of transmittal power. The second interface surface 36 of the fiber guides 32 is preferably square, as shown in FIG. 3, but may be of other polygonal shapes such as rectangle, triangle, pentagon, hexagon, octagon (FIGS. 3b–3f), etc. The second transmitting section 34 may be circular, as shown in FIG. 3, or it may be elliptical (FIG. 3g) or a polygon, such as a square, a rectangle, a triangle, a pentagon, a hexagon, an octagon (FIGS. 3a–3f), etc.

The first coupler 22 is in optical communication with the second coupler 30 so that light may be transmitted from the first coupler 22 to the second coupler 30, or vice versa, through the common plane of the first interface surface 26 and second interface surface 36.

The fiber light guides 32 of the second coupler 30 are arranged in mutual, lateral juxtaposition so that the second interface surfaces 36 abut the first interface surface 26 and are thus positioned to transmit light to or from the first interface surface 26. Furthermore, because of the polygonal cross-sectional shape of the second interface surfaces 36, the fiber light guides 32 can be arranged with substantially no interfiber gaps between the respective second interface surface 36 thereof. Moreover, the combined cross-sectional area of the second interface surfaces 36 of the fiber guides 32 is substantially equal to the cross-sectional area of the first interface surface 26 of the first coupler 22, and the second interface surfaces 36 are arranged so that substantially the entire cross-sectional area of the first interface surface 36 is covered by the second interface surfaces of the fiber light guides 32.

Accordingly, when light is transmitted from the first coupler 22 to the second coupler 30, so that the first coupler 22 is an input coupler and the second coupler 30 is an output coupler, minimal or no output losses due to interfiber gaps are experienced.

The input coupler 22, having a polygonal first interface surface 26 and a polygonal cross-sectional shape for at least a portion of the first transition section 28, utilizes the light scrambling mechanism of polygonal optical waveguides whereby multiple internal reflections during propagation of light through the waveguide results in an output intensity distribution that is relatively uniform. This is particularly true for a square waveguide. The length of the transition is preferably determined experimentally such that intensity losses are within an acceptable level during the transition of light from the first transmitting section 24 to the first interface surface 26. In general, the longer and smoother the transition is, the more adiabatic the transition. On the other hand, as the length of the transition becomes larger, other losses, such as absorption and diffraction losses, become greater. Therefore, in choosing the length of the transition, the balance between adiabatic transition and absorption and diffraction losses, as well as the respective transverse dimensions and numerical apertures of the first transmitting section and the first interface surface must be considered.

In the embodiment shown in FIG. 3, there are four individual single fiber guides 32 in the second coupler 30. Each guide 32 includes a second transition section 38, but, where the second coupler 30 comprises an output coupler, the input (i.e., second interface surface 36) is a square and the output (i.e., second transmitting section 34) is circular. Each second interface surface 36 covers one-quarter of the output area of the first interface surface 26, and thus captures one-quarter of the output power. The second transition sections 38 of the fiber guides 32 are also arranged so as to transform the square input into a circular output adiabatically without excess loss in power. The amount of taper (if taper is necessary to smoothly transition between sections of different cross-sectional area) can be tailored to fit output area (i.e., the interface surface) and numerical aperture requirements. That is, in order to conserve brightness, the product of the transverse dimension (e.g., diameter for a circle or width for a square) and the numerical aperture is constant. Thus, the size of each of the second interface surfaces 36 and the tapering ratio of each of the second transition sections 38 can be defined to fully cover the first interface surface 26 and achieve a desired numerical aperture within the second coupler 30.

The materials of the first and second couplers 22, 30 can be glass, quartz, plastic, or acrylic. The interface between the first interface surface 26 and the second interface surfaces 36 can be joined together with an optical epoxy to provide mechanical stability and to eliminate Fresnel reflections. Alternatively, the first and second couplers 22, 30 can be integral portions of a single unit.

The optical coupling 20 can also be used to transmit light from the second coupler 30 to the first coupler 22 in which case it becomes a multi-port illuminator, as described below.

Figure 4:
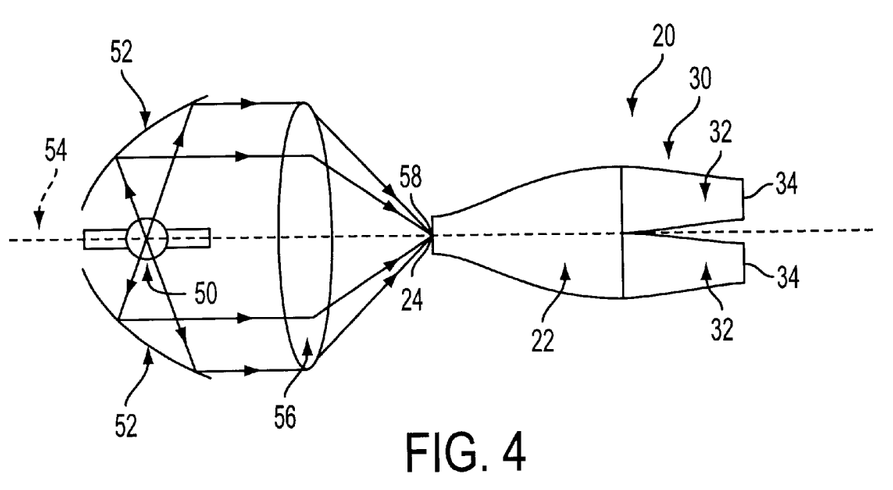
FIG. 4 is a schematic view of an optical system including the coupler of the present invention combined with a light source, a parabolic mirror, and a focusing lens.

FIG. 4 shows an optical system employing an optical coupling 20 according to the present invention. The system includes a lamp 50, preferably an arc lamp, such as a mercury arc lamp or a sodium arc lamp, placed at the focal point of a parabolic reflector 52. The light collected by the reflector 52 will be collimated and will exit the reflector parallel to the optical axis 54 thereof. A focusing lens 56 is placed at the output of the parabolic reflector 52 such that all the collimated light will be directed to the focal point 58 of the lens 56.

The optical coupling 20 is positioned and oriented such that the first transmitting section 24 of the first coupler 22 is positioned so as to receive the focused light at the focal point 58 and thereafter transmit the light to the second coupler 30 where it is divided into the individual fiber guides 32 and is output at the second transmitting sections 34. In the arrangement shown in FIG. 4, the cross-sectional shape of the first transmitting section 24 is preferably circular to properly match the image of the focused lamp 50. The cross-sectional shape of the second transmitting sections 34 can be made circular so as to match circular output fibers (not shown).

Figure 5:
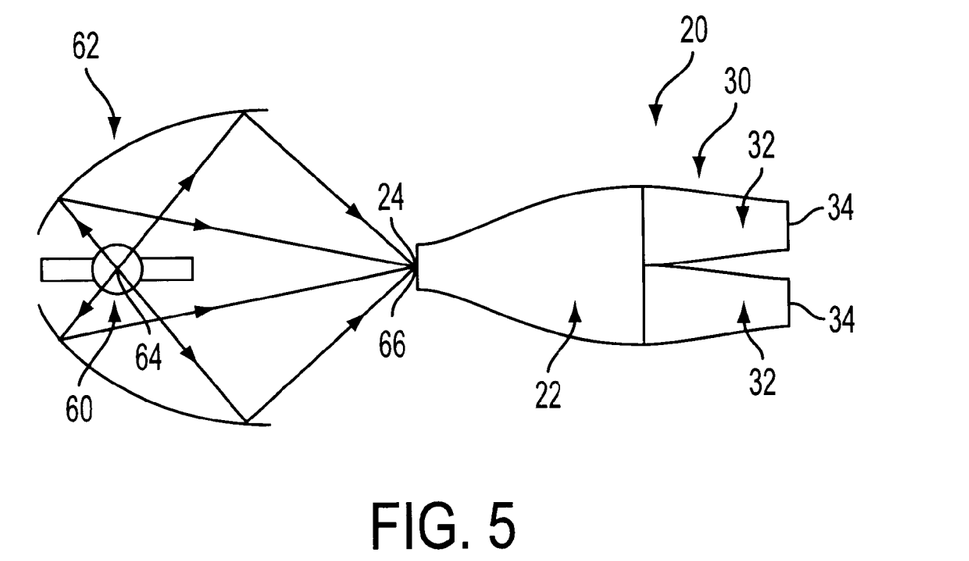
FIG. 5 is a schematic view of an optical system including the coupler of the present invention combined with a light source and an elliptical reflector.

FIG. 5 shows an optical system including a lamp 60, and an elliptical reflector 62 having a first focal point 64 and a second focal point 66. The lamp 60 is placed at the first focal point 64 so that the light collected by the reflector 62 is focused at the second focal point 66. The optical coupling 20 is positioned so that the first transmitting section 24 is located at the second focal point 66 to receive the light reflected by the reflector 62.

Figure 6:
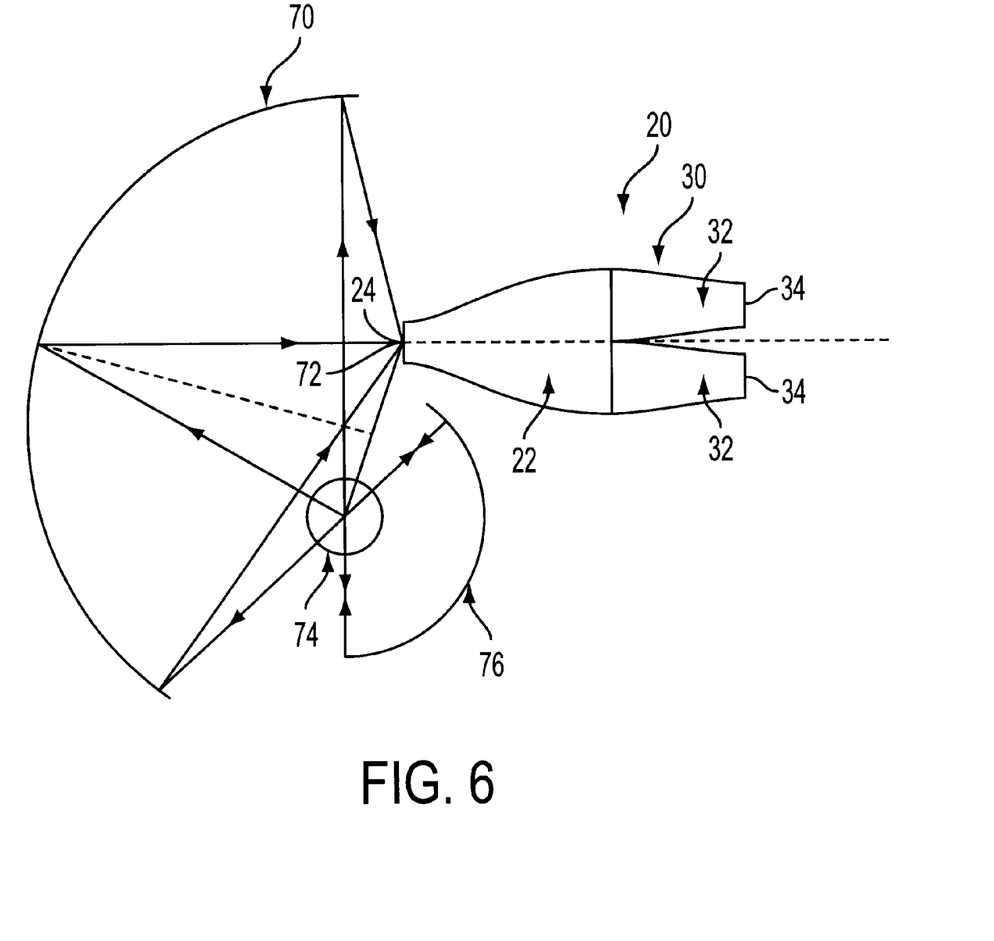
FIG. 6 is a schematic view of an optical system including the coupler of the present invention combined with a light source, a primary reflector, and a retro-reflector.

FIG. 6 shows an implementation of the optical coupling 20 in an off-axis system in which a primary reflector 70, which is either spherical, toroidal, or ellipsoidal, projects an image from a lamp 74 onto the first transmitting section 24 of the coupling 20 with about 1:1 magnification. A retro-reflector 76 may also be included in the system to reflect light from the opposite side of the lamp 74 back into the arc itself and thereafter to the primary reflector 70 to increase the overall brightness of the focused image, and, as a result, the total output power. In the arrangement shown in FIG. 6, the light collecting system including the lamp 74, the primary reflector 70, and the retro-reflector 76, does not have an axis of symmetry and thus, the output at the focal point 72 is the direct image of the arc of the lamp 74, which is typically not circular. As a result, to capture the entire output of the arc with maximum brightness, a non-circular cross-sectional shape that matches the intensity profile of the arc is preferred for the first transmitting section 24. Suitable non-circular cross-sectional shapes include rectangular or elliptical.

Figure 7:
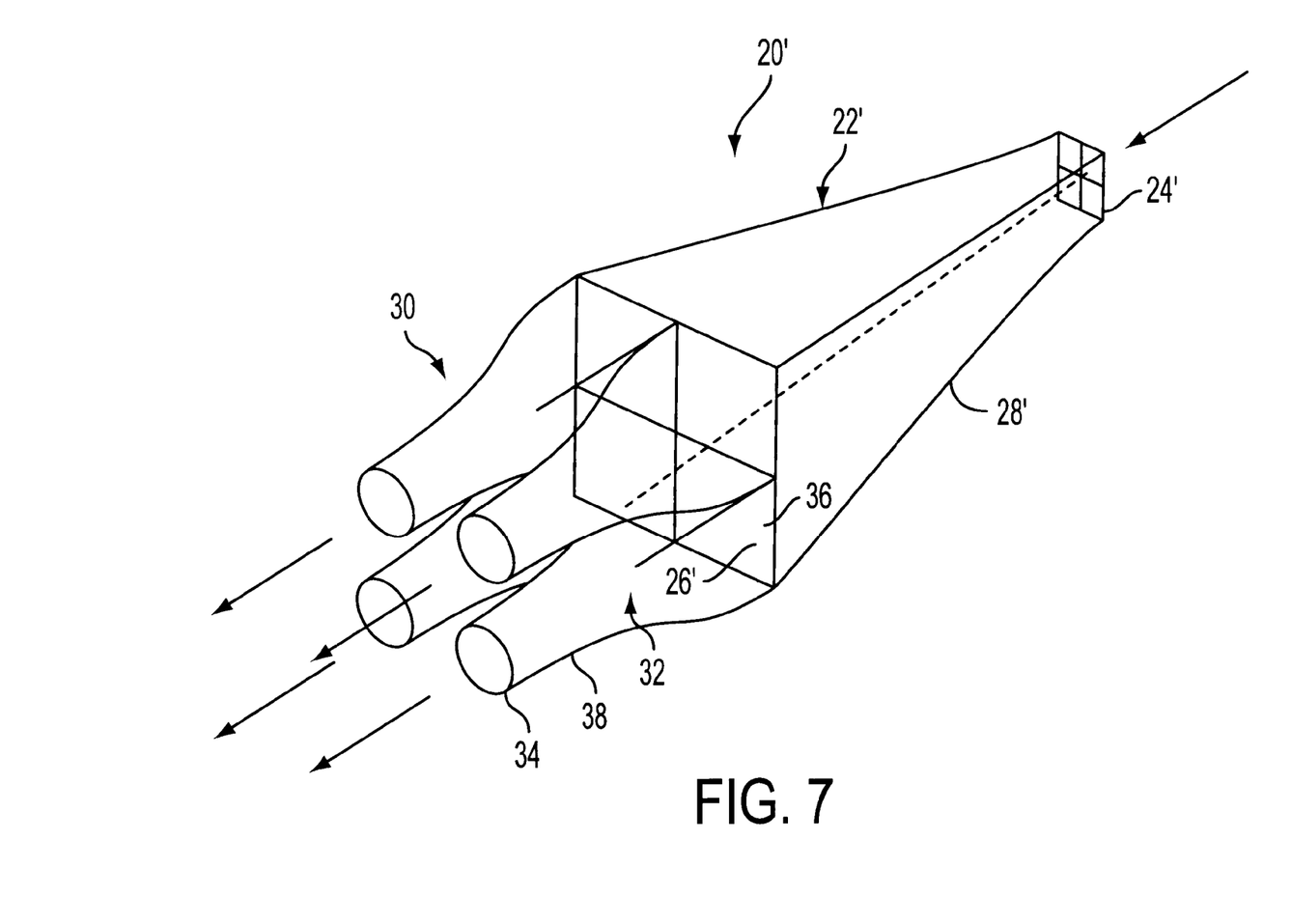
FIG. 7 is a perspective view of a second embodiment of the coupler of the present invention.

FIG. 7 shows an arrangement of an optical coupling 20' having a non-circular, rectangular cross-sectional shape at its first transmitting section 24'. The rectangular first transmitting section 24' is connected by a first transition section 28' to a first interface surface 26' that is preferably square in cross-sectional shape. The second coupler 30 in the illustrated embodiment is identical to the second coupler 30 of the first embodiment shown in FIG. 1 and includes four individual single fiber guides 32, each having a second interface surface 36 that is preferably square in cross-sectional shape, and a second transition section 38 connecting the second interface surface 36 to a second transmitting section second transmitting section 34 that is preferably circular in shape.

The light collecting system of FIG. 6 also creates angles of light incident onto the first transmitting section 24' that are of different incident angles in the vertical and horizontal directions. As a result, the first transition section 28' can be designed such that the output numerical aperture at the square first interface surface 26' of the first coupler 22' could be made the same in both the horizontal and vertical directions.

In general, the shape of the first interface surface 26' need not be square. Depending on the transformation in the vertical and horizontal directions, it could be a rectangle. Thus, the second coupler 30 need not be an array of 2×2 fiber guides 32, but instead could be an array of, for example, 2×3, depending on the overall design.

Figure 8:
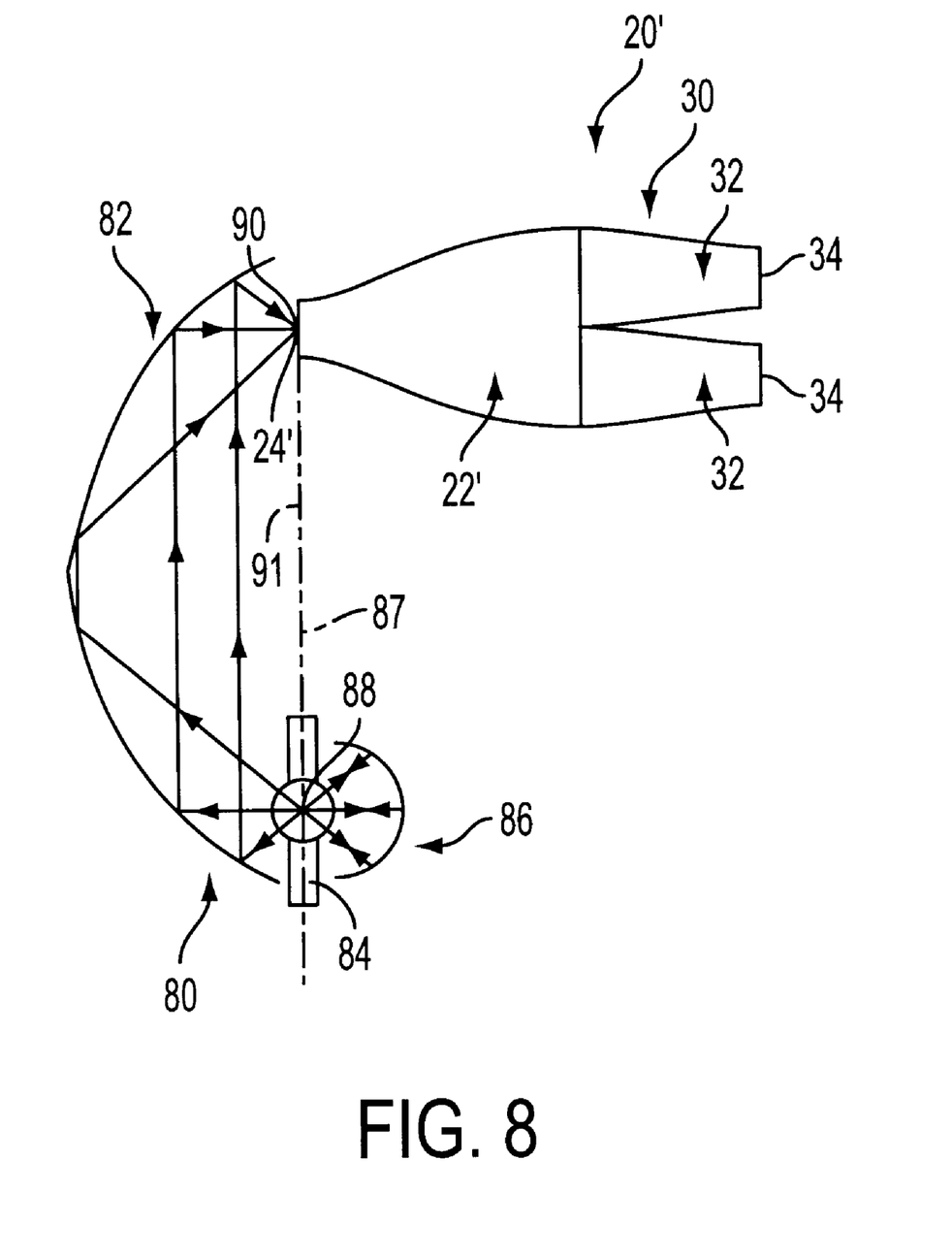
FIG. 8 is a schematic view of an optical system including the coupler according to the second embodiment of the present invention combined with a light source, two parabolic reflector sections, and a retro-reflector.

FIG. 8 shows another embodiment of an optical system employing a optical coupling 20' having a non-circular first transmitting section 24'. The system of FIG. 8 employs two reflectors 80 and 82, each comprising a section of a paraboloid of revolution. The reflectors 80, 82 are arranged so that their respective optical axes 89, 91 are generally co-linear. A lamp 84 is positioned at the first focal point 88 of the first paraboloid 80. Light from the lamp 84 is collimated by the first paraboloid 80 and reflected in a direction parallel to its optical axis. A retro-reflector 86 may be employed to capture additional light output from the lamp 84 and thereby increase the intensity of the collimated output of the first paraboloid 80. The retro-reflector 86 reflects light back through the first focal point 88 and toward the first paraboloid 80. The collimated rays are reflected by the second paraboloid 82 to its focal point 90. The optical coupling 20' is placed with the first transmitting section 24' at the focal point 90 of the second paraboloid 82. Since the image at the second focal point 90 is preferably a 1:1 image of the lamp 84, the cross-sectional shape of the first transmitting section 24' is preferably non-circular for optimum coupling.

Figure 9:
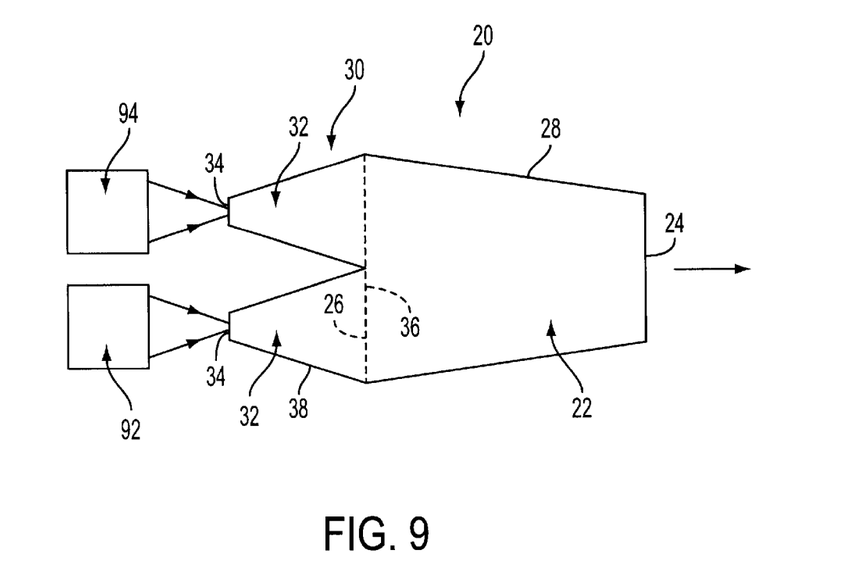
FIG. 9 is a side view of the coupler of the present invention arranged so as to couple the light output of two or more light sources into a single optic fiber light guide.

Although each of the above embodiments are applied to providing multi-port capability for illuminations, the coupler 20 (20') when used in reverse can be used to combine the outputs of multiple light sources without a loss of brightness. FIG. 9 shows an example of such an embodiment. A first light source 92 and a second light source 94, which can be of one type of light source or a combination of the systems described above, are arranged with respect to the coupler 20 such that each will focus its collected light into the respective second transmitting section 34 of the individual fiber guides 32 of the second coupler 30. Accordingly, the second coupler 30 is an input coupler, the first coupler 22 is an output coupler, and the first transmitting section 24 is an output surface. The shape of the first transmitting section 24 can be a circle or a polygon, depending on the optical illumination application.

Figure 10:
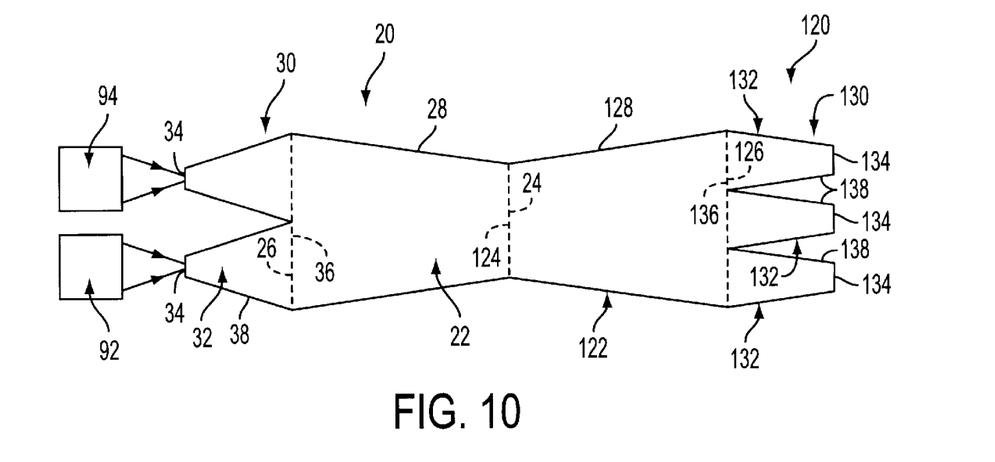
FIG. 10 is a side view of an optical coupling assembly comprising two optic couplers arranged in series.

Multiple couplers may be used in combination. For example, as shown in FIG. 10, a first coupling 20, having a first coupler 22 with a first transmitting section 24, a first interface surface 26, and a first transition section 28 and a second coupler 30 with optic guides 32, each having a second transmitting section 34, a second interface surface 36, and a second transition section 38, may be used to couple multiple inputs 92, 94 into one intermediate output at first transmitting section 24. A second coupling 120 has a third coupler 122 with a third transmitting section 124, a third interface surface 126, and a third transition section 128 and a fourth coupler 130 having optic guides 132, each with a fourth transmitting section 134, a fourth interface surface 136, and a fourth transition section 138. The second coupling 120 may be used to couple the intermediate output at transmitting section 24 as a single input at transmitting section 124 to multiple final outputs at transmitting sections 134 of output fibers 132. The number of inputs may be the same as, less than, or greater than the number of final outputs.

Figure 11:
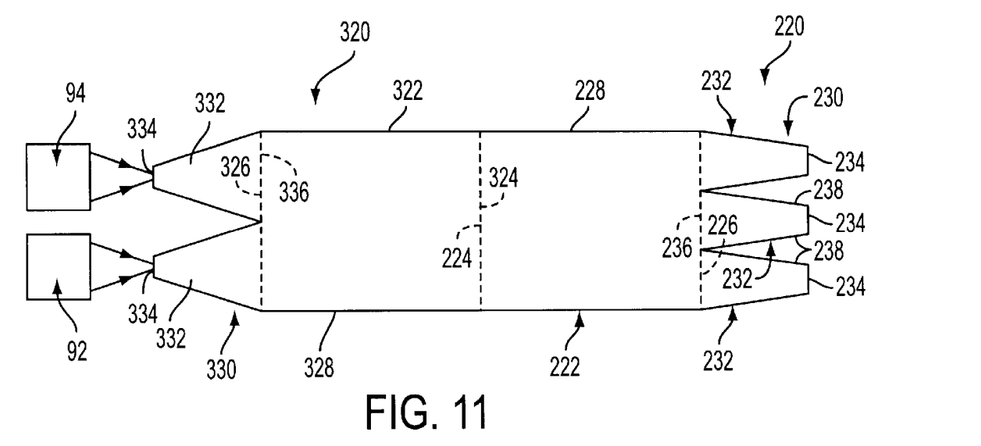
FIG. 11 is a side view of an alternative optical coupling assembly comprising two optic couplers arranged in series.

FIG. 11 shows combined optic couplings 220 and 320. Coupling 320 has a first coupler 322 with a first transmitting section 324, a first interface surface 326, and a first transition section 328. Coupling 320 further includes a second coupler 330 having optic guides 332, each with a second transmitting section 334, a second interface surface 336, and a second transition section 338. The cross-sectional area of the first interface surface 326 is substantially the same as that of the first transmitting section 324, so that the first transition section 328 is substantially straight and untapered. The first and second interface surfaces 326, 336 have a polygonal (e.g., triangle, rectangle, square, pentagon, hexagon, octagon, etc.) cross-sectional shape.

Coupling 220 has a third optic coupler 222 with a third transmitting section 224, a third interface surface 226, and a third transition section 228. Coupling 220 further includes a fourth optic coupler 230 with optic guides 232, each having a fourth transmitting section 234, a fourth interface surface 326, and a fourth transition section 238. The cross-sectional area of the third interface surface 226 is substantially the same as that of the third transmitting section 224, so that the third transition section 328 is substantially straight and untapered. The third and fourth interface surfaces 226, 236 preferably have a polygonal (e.g., triangle, rectangle, square, pentagon, hexagon, octagon, etc.) cross-sectional shape.

Note that the substantially straight first and third transition sections 328, 228 define a substantially straight, continuous transition section connecting the first and third interface surfaces 326, 226 (thus also connecting the second and fourth interface surfaces 336, 236). Of course, straight and tapered transition sections may be mixed. That is the first transition section 328 could be substantially straight while the third transition section 228 is tapered (inwardly or outwardly), or vice versa.

The lamps used as the inputs 92, 94 in FIGS. 9, 10, and 11 may be different, and different types of lamps may be combined to achieve desired output characteristics. For example, combining a mercury lamp and a sodium lamp can give an output that is closer to daylight than the bluish mercury lamp or the yellowish sodium lamp.

Multiple input fibers can be used with multiple respective lamps as backups or spares should one of the lamps burn out or otherwise malfunction.

Although each of the embodiments shown includes a second coupler 30 that has four individual single fiber guides 32, the number of single fiber guides in the second coupler 30 of the optical coupling 20 (or 20') can be any number of two or more single guides. In addition, although in the embodiments shown, the second interface surfaces 36 of each of the fiber guides is of the same cross-sectional shape and area, the respective size and shape of each of the second interface surfaces 36 need not be the same. Various sizes and shapes can be used so long as the whole area of the first interface surface 26 (or 26') is covered so that there are no interfiber gaps.

While the invention has been described in connection with what are presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

What is claimed is:

1. An optical system comprising:
   a first coupler including:
      a first transmitting section comprising a single fiber light guide, a first interface surface that has a polygonal cross-sectional shape, and a first transition section connecting said first transmitting section and said first interface surface and having a cross-sectional shape that varies substantially smoothly from the cross-sectional shape of said first transmitting section to the cross-sectional shape of said first interface surface; and a second coupler comprising at least two single fiber light guides, each of said single fiber light guides including:
a second transmitting section,
a second interface surface that has a polygonal cross-sectional shape, and
a second transition section connecting said second transmitting section and said second interface surface and having a cross-sectional shape that varies substantially smoothly from the cross-sectional shape of said second transmitting section to the cross-sectional shape of said second interface surface, said first coupler being in optical communication with said second coupler whereby said at least two single fiber light guides of said second coupler are arranged in mutual, lateral juxtaposition with said second interface surfaces thereof operatively positioned to transmit light between said second interface surfaces of said second coupler and said first interface surface of said first coupler and without substantial gaps between adjacent ones of the second interface surfaces of said at least two single fiber light guides, and wherein said second interface surfaces of said at least two single fiber light guides of said second coupler have a combined cross-sectional area that is substantially equal to a cross-sectional area of said first interface surface of said first coupler, so that said first interface surface is substantially covered by the second interface surfaces of said at least two single fiber light guides of said second coupler.

2. The optical system of claim 1, wherein said first interface surface has a cross-sectional area that is greater than a cross-sectional area of said first transmitting section.

3. The optical system of claim 1, wherein said first interface surface has a cross-sectional area that is substantially the same as the cross-sectional area of said first transmitting section.

4. The optical system of claim 1, wherein said second interface surface of each of said at least two single fiber light guides has a cross-sectional area that is greater than a cross-sectional area of said second transmitting section.

5. The optical system of claim 1, wherein the cross-sectional shape of said first interface surface of said first coupler is a polygon selected from the group consisting of a triangle, a square, a rectangle, a pentagon, a hexagon, and an octagon.

6. The optical system of claim 1, wherein the cross-sectional shape of said second interface surface of each of said at least two single fiber light guides of said second coupler is a polygon selected from the group consisting of a triangle, a square, a rectangle, a pentagon, a hexagon, and an octagon.

7. The optical system of claim 1, wherein the cross-sectional shape of said first transmitting section of said first coupler is circular.

8. The optical system of claim 1, wherein the cross-sectional shape of said first transmitting section of said first coupler is elliptical.

9. The optical system of claim 1, wherein the cross-sectional shape of said first transmitting section of said first coupler is a polygon.

10. The optical system of claim 9, wherein the cross-sectional shape of said first transmitting section of said first coupler is a polygon selected from the group consisting of a triangle, a square, a rectangle, a pentagon, a hexagon, and an octagon.

11. The optical system of claim 1, wherein the cross-sectional shape of said second transmitting section of each of said at least two single fiber light guides of said second coupler is circular.

12. The optical system of claim 1, wherein the cross-sectional shape of said second transmitting section of each of said at least two single fiber light guides of said second coupler is elliptical.

13. The optical system of claim 1, wherein the cross-sectional shape of said second transmitting section of each of said at least two single fiber light guides of said second coupler is a polygon.

14. The optical system of claim 13, wherein the cross-sectional shape of said second transmitting section of each of said at least two single fiber light guides of said second coupler is a polygon selected from the group consisting of a triangle, a square, a rectangle, a pentagon, a hexagon, and an octagon.

15. The optical system of claim 1, wherein the cross-sectional shapes and areas of said second interface surfaces of said at least two single fiber light guides of said second coupler are the same.

16. The optical system of claim 1, wherein said first transition section of said first coupler has a linear taper.

17. The optical system of claim 1, wherein said first transition section of said first coupler has a nonlinear taper.

18. The optical system of claim 1, wherein said second transition section of each of said at least two fiber light guides of said second coupler has a linear taper.

19. The optical system of claim 1, wherein said second transition section of each of said at least two fiber light guides of said second coupler has a nonlinear taper.

20. The optical system of claim 1, further comprising a source of focused light constructed and arranged to direct light toward a focal point of said source, said first coupler being disposed with said first transmitting section thereof positioned at said focal point to receive light from said source of focused light, thereby dividing the light output of said source of focused light into each of said at least two single fiber light guides of said second coupler.

21. The optical system of claim 20, wherein said source of focused light comprises:
a substantially parabolic reflector having a focal point;
a lamp positioned substantially at said focal point of said substantially parabolic reflector to generate collimated light rays reflected from said substantially parabolic reflector; and
a focusing lens constructed and arranged to receive the collimated rays reflected from said parabolic reflector and to focus the rays toward said focal point of said source of focused light.

22. The optical system of claim 20, wherein said source of focused light comprises:
a substantially elliptical reflector having first and second focal points, said second focal point substantially coinciding with said focal point of said source of focused light; and
a lamp positioned substantially at said first focal point to generate rays of light reflected by said substantially elliptical reflector toward said second focal point.

23. The optical system of claim 20, wherein said source of focused light comprises:

a primary reflector having at least one focal point corresponding to the focal point of said source of focused light;

a lamp positioned with respect to said primary reflector so that light reflected by said primary reflector is focused to said focal point of said source of focused light; and a retro-reflector disposed on a side of said lamp opposite said primary reflector to capture additional light and reflect it back toward said primary reflector.

24. The optical system of claim 20, wherein said source of focused light comprises:

first and second parabolic reflectors having respective first and second focal points and respective first and second optical axes, said first and second parabolic reflectors arranged so as to open toward each other and so that the respective first and second optical axes thereof are substantially co-linear;

a lamp positioned at said first focal point of said first parabolic reflector so that light reflected by said first parabolic reflector is collimated and reflected toward said second parabolic reflector in a direction generally parallel to said first and second optical axes, wherein said second focal point corresponds to the focal point of said source of focused light; and a retro-reflector disposed on a side of said lamp opposite said first parabolic reflector and constructed and arranged to capture additional light and reflect it through said first focal point back toward said first parabolic reflector.

25. The optical system of claim 1, further comprising a source of focused light associated with each of said at least two single fiber light guides, each of said sources of focused light being constructed and arranged to direct light toward a focal point thereof, said second coupler being disposed with said second transmitting section of each of said at least two single fiber light guides positioned at said focal point of each said associated source of focused light, thereby combining the light output of said sources of focused light into said single fiber light guide of said first coupler.

26. The optical system of claim 25, wherein each of said associated sources of focused light includes a lamp, and wherein the same type of lamp comprises the lamp of each of said associated sources of focused light.

27. The optical system of claim 25, wherein each of said associated sources of focused light includes a lamp, and wherein at least two of said associated sources of focused light have different types of lamp.

28. The optical system of claim 1, further comprising:

a third coupler including:
  a third transmitting section comprising a single fiber light guide operatively positioned to receive light from said first transmitting section of said first coupler,
  a third interface surface that has a polygonal cross-sectional shape, and
  a third transition section connecting said third transmitting section and said third interface surface and having a cross-sectional shape that varies substantially smoothly from the cross-sectional shape of said third transmitting section to the cross-sectional shape of said third interface surface; and a fourth coupler comprising at least two single fiber light guides, each of said single fiber light guides including:
  a fourth transmitting section,
  a fourth interface surface that has a polygonal cross-sectional shape, and
  a fourth transition section connecting said fourth transmitting section and said fourth interface surface and having a cross-sectional shape that varies substantially smoothly from the cross-sectional shape of said fourth transmitting section to the cross-sectional shape of said fourth interface surface, said third coupler being in optical communication with said fourth coupler whereby said at least two single fiber light guides of said fourth coupler are arranged in mutual, lateral juxtaposition with said fourth interface surfaces thereof operatively positioned to transmit light between said fourth interface surfaces of said fourth coupler and said third interface surface of said third coupler and without substantial gaps between adjacent ones of the fourth interface surfaces of said at least two single fiber light guides, and wherein said fourth interface surfaces of said at least two single fiber light guides of said fourth coupler have a combined cross-sectional area that is substantially equal to a cross-sectional area of said third interface surface of said third coupler, so that said third interface surface is substantially covered by the fourth interface surfaces of said at least two single fiber light guides of said fourth coupler.

29. The optical system of claim 28, wherein the cross-sectional area of said first interface surface is substantially the same as the cross-sectional area of said first transmitting section.

30. The optical system of claim 28, wherein the cross-sectional area of said first interface surface is greater than the cross-sectional area of said first transmitting section.

31. The optical system of claim 28, wherein the cross-sectional area of said third interface surface is substantially the same as the cross-sectional area of said third transmitting section.

32. The optical system of claim 28, wherein the cross-sectional area of said third interface surface is greater than the cross-sectional area of said third transmitting section.

33. An optical system comprising:

a first coupler including a first interface surface that has a polygonal cross-sectional shape; and a second coupler comprising at least two single fiber light guides, each of said single fiber light guides including a second interface surface that has a polygonal cross-sectional shape, said first coupler being in optical communication with said second coupler whereby said at least two single fiber light guides of said second coupler are arranged in mutual, lateral juxtaposition with said second interface surfaces thereof operatively positioned to transmit light between said second interface surfaces of said second coupler and said first interface surface of said first coupler and without substantial gaps between adjacent ones of the second interface surfaces of said at least two single fiber light guides, and wherein said second interface surfaces of said at least two single fiber light guides of said second coupler have a combined cross-sectional area that is substantially equal to a cross-sectional area of said first interface surface of said first coupler, so that said first interface surface is substantially covered by the second interface surfaces of said at least two single fiber light guides of said second coupler.

34. An optical system comprising:

a first coupler including a first interface surface that has a polygonal cross-sectional shape;

a second coupler comprising at least two single fiber light guides, each of said single fiber light guides including a second interface surface that has a polygonal cross-sectional shape, said first coupler being in optical communication with said second coupler whereby said at least two single fiber light guides of said second coupler are arranged in mutual, lateral juxtaposition with said second interface surfaces thereof operatively positioned to transmit light between said second interface surfaces of said second coupler and said first interface surface of said first coupler and without substantial gaps between adjacent ones of the second interface surfaces of said at least two single fiber light guides, and wherein said second interface surfaces of said at least two single fiber light guides of said second coupler have a combined cross-sectional area that is substantially equal to a cross-sectional area of said first interface surface of said first coupler, so that said first interface surface is substantially covered by the second interface surfaces of said at least two single fiber light guides of said second coupler;

first and second parabolic reflectors having respective first and second focal points and respective first and second optical axes, said first and second parabolic reflectors arranged so as to open toward each other and so that the respective first and second optical axes thereof are substantially co-linear;

a lamp positioned at said first focal point of said first parabolic reflector so that light reflected by said first parabolic reflector is collimated and reflected toward said second parabolic reflector in a direction generally parallel to said first and second optical axes, wherein said first coupler is operatively positioned at said second focal point so as to receive light focused by said first and second parabolic reflectors; and a retro-reflector disposed on a side of said lamp opposite said first parabolic reflector and constructed and arranged to capture additional light and reflect it through said first focal point back toward said first parabolic reflector.

35. An optical system comprising:

a first coupler including a first interface surface that has a polygonal cross-sectional shape;

a second coupler comprising at least two single fiber light guides, each of said single fiber light guides including a second interface surface that has a polygonal cross-sectional shape, said first coupler being in optical communication with said second coupler whereby said at least two single fiber light guides of said second coupler are arranged in mutual, lateral juxtaposition with said second interface surfaces thereof operatively positioned to transmit light between said second interface surfaces of said second coupler and said first interface surface of said first coupler and without substantial gaps between adjacent ones of the second interface surfaces of said at least two single fiber light guides, and wherein said second interface surfaces of said at least two single fiber light guides of said second coupler have a combined cross-sectional area that is substantially equal to a cross-sectional area of said first interface surface of said first coupler, so that said first interface surface is substantially covered by the second interface surfaces of said at least two single fiber light guides of said second coupler;

a substantially parabolic reflector having a focal point;

a lamp positioned substantially at said focal point of said substantially parabolic reflector to generate collimated light rays reflected from said substantially parabolic reflector; and a focusing lens constructed and arranged to receive the collimated rays reflected from said parabolic reflector and to focus the rays toward a focal point thereof, said first coupler being operatively positioned at said focal point of said focusing lens to receive light focused by said focusing lens.

36. An optical system comprising:

a first coupler including a first interface surface that has a polygonal cross-sectional shape;

a second coupler comprising at least two single fiber light guides, each of said single fiber light guides including a second interface surface that has a polygonal cross-sectional shape, said first coupler being in optical communication with said second coupler whereby said at least two single fiber light guides of said second coupler are arranged in mutual, lateral juxtaposition with said second interface surfaces thereof operatively positioned to transmit light between said second interface surfaces of said second coupler and said first interface surface of said first coupler and without substantial gaps between adjacent ones of the second interface surfaces of said at least two single fiber light guides, and wherein said second interface surfaces of said at least two single fiber light guides of said second coupler have a combined cross-sectional area that is substantially equal to a cross-sectional area of said first interface surface of said first coupler, so that said first interface surface is substantially covered by the second interface surfaces of said at least two single fiber light guides of said second coupler;

a substantially elliptical reflector having first and second focal points; and a lamp positioned substantially at said first focal point to generate rays of light reflected by said substantially elliptical reflector toward said second focal point, said first coupler being operatively positioned at said second focal point of said substantially elliptical reflector to receive light focused by said substantially elliptical reflector.

37. An optical system comprising:

a first coupler including a first interface surface that has a polygonal cross-sectional shape;

a second coupler comprising at least two single fiber light guides, each of said single fiber light guides including a second interface surface that has a polygonal cross-sectional shape, said first coupler being in optical communication with said second coupler whereby said at least two single fiber light guides of said second coupler are arranged in mutual, lateral juxtaposition with said second interface surfaces thereof operatively positioned to transmit light between said second interface surfaces of said second coupler and said first interface surface of said first coupler and without substantial gaps between adjacent ones of the second interface surfaces of said at least two single fiber light guides, and wherein said second interface surfaces of said at least two single fiber light guides of said second coupler have a combined cross-sectional area that is substantially equal to a cross-sectional area of said first interface surface of said first coupler, so that said first interface surface is substantially covered by the second interface surfaces of said at least two single fiber light guides of said second coupler;

a primary reflector having at least one focal point;

a lamp positioned with respect to said primary reflector so that light reflected by said primary reflector is focused to said focal point, said first coupler being operatively positioned at said focal point of said primary reflector to receive light focused by said primary reflector; and a retro-reflector disposed on a side of said lamp opposite said primary reflector to capture additional light and reflect it back toward said primary reflector.

* * * * *